US012673743B2

(12) United States Patent (10) Patent No.: US 12,673,743 B2
Wada et al. (45) Date of Patent: Jul. 7, 2026

(54) CONTROL SYSTEM, STRADDLE TYPE VEHICLE, CONTROL METHOD, AND STORAGE MEDIUM

(71) Applicant: HONDA MOTOR CO., LTD., Tokyo (JP)

(72) Inventors: Yosuke Wada, Tokyo (JP); Yohei Kawasaki, Tokyo (JP); Ryoga Suzuki, Tokyo (JP); Ryuta Kikuchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 19/291,286

(22) Filed: Aug. 5, 2025

(65) Prior Publication Data

US 2025/0360984 A1 Nov. 27, 2025

Related U.S. Application Data

(63) Continuation of application No. PCT/JP2024/008270, filed on Mar. 5, 2024.

(30) Foreign Application Priority Data

Mar. 31, 2023 (JP) ................................. 2023-059053

(51) Int. Cl.
*B60G 17/015* (2006.01)
*B62J 45/00* (2020.01)
(Continued)

(52) U.S. Cl.
CPC ........ *B62K 25/04* (2013.01); *B62K 2025/044* (2013.01)

(58) Field of Classification Search
CPC ......... B60G 17/015; B62J 45/00; B62J 45/41; B62J 45/412; B62J 45/414; B62J 45/415;
(Continued)

(56) References Cited

U.S. PATENT DOCUMENTS 12,522,295 B2 * 1/2026 Iizuka ................ B62D 15/0265
2011/0153158 A1 6/2011 Acocella
(Continued)

FOREIGN PATENT DOCUMENTS

CN 111527295 A * 8/2020 ...... B60W 30/18136
JP S62103215 A 5/1987
(Continued)

OTHER PUBLICATIONS

International Search Report and Written Opinion for PCT/JP2024/008270 mailed May 21, 2024, with partial translation.

*Primary Examiner* — Jason D Shanske
*Assistant Examiner* — Daniel M. Keck
(74) *Attorney, Agent, or Firm* — THOMAS | HORSTEMEYER, LLP

(57) ABSTRACT

The present invention provides a control system of a straddle type vehicle, estimating a second force acting on a rear wheel of the straddle type vehicle from an obstacle, on a basis of a first force acting on a front wheel of the straddle type vehicle from the obstacle; and controlling a rear suspension mechanism configured to support the rear wheel, on a basis of an estimation result, when the rear wheel is affected by the obstacle, wherein a force converted from the first force according to a difference in a state of the straddle type vehicle between when the front wheel is affected by the obstacle and when the rear wheel is affected by the obstacle is estimated as the second force.

14 Claims, 6 Drawing Sheets

(51) Int. Cl.

| | | |
|---|---|---|
| *B62J 45/41* | (2020.01) | |
| *B62J 45/412* | (2020.01) | |
| *B62J 45/414* | (2020.01) | |
| *B62J 45/415* | (2020.01) | |
| *B62K 25/04* | (2006.01) | |
| *B62K 25/16* | (2006.01) | |
| *B62K 25/20* | (2006.01) | |

(58) Field of Classification Search
CPC ........ B62K 25/04; B62K 25/16; B62K 25/20;
B62K 2025/044
USPC ...................................................... 280/5.508
See application file for complete search history.

(56) References Cited

U.S. PATENT DOCUMENTS

| | | | |
|---|---|---|---|
| 2017/0080769 A1 | 3/2017 | Kurita | |
| 2020/0276961 A1 * | 9/2020 | Kaneta ..................... | B60T 8/26 |

FOREIGN PATENT DOCUMENTS

| | | | |
|---|---|---|---|
| JP | 2011-529822 A | 12/2011 | |
| JP | 2015-205645 A | 11/2015 | |
| JP | 2018-075903 A | 5/2018 | |
| WO | 2024/203025 A1 | 10/2024 | |
| WO | WO-2024203085 A1 * | 10/2024 | .......... B60T 8/17554 |

* cited by examiner

FIG. 2

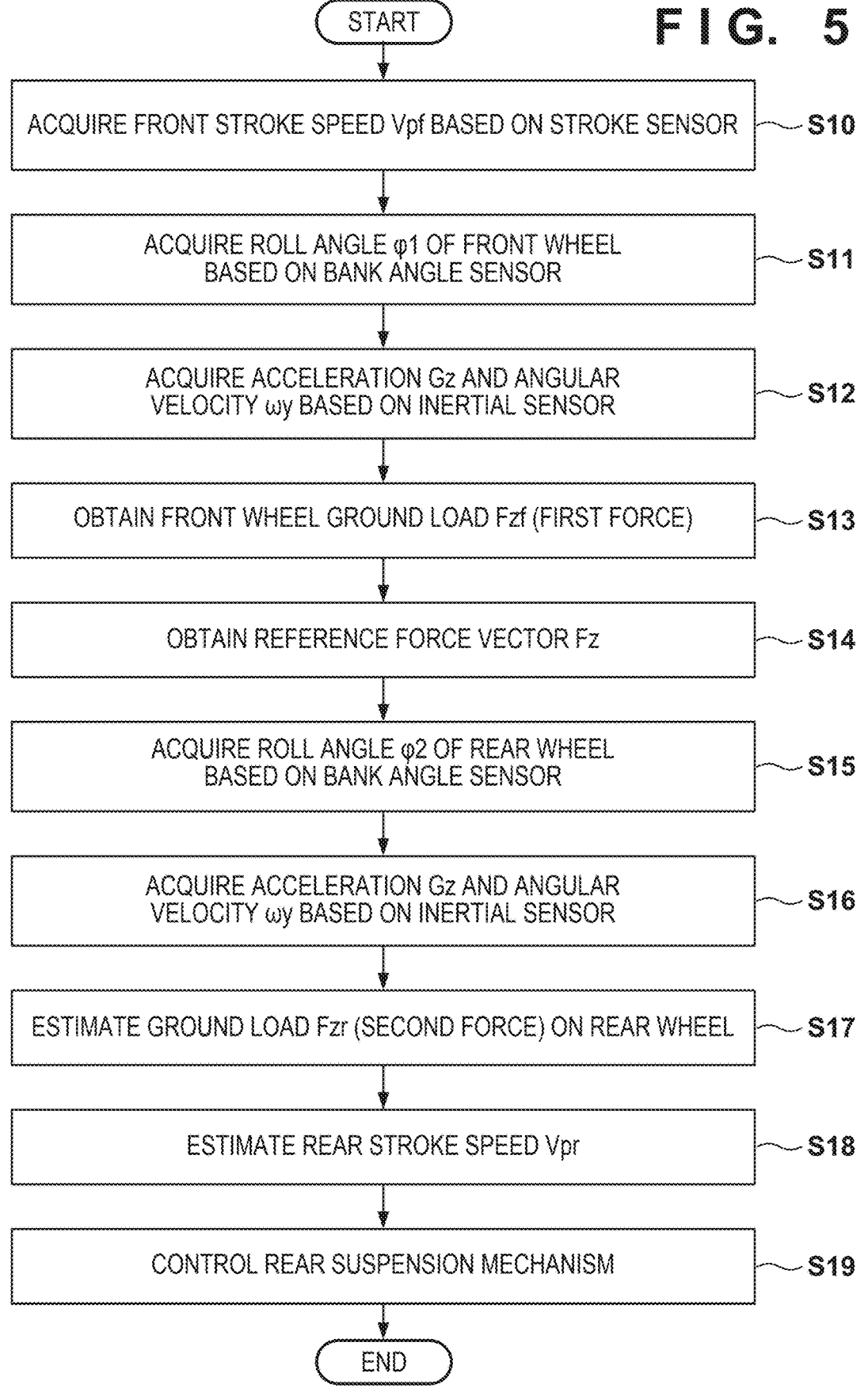

FIG. 5

START

ACQUIRE FRONT STROKE SPEED Vpf BASED ON STROKE SENSOR — S10

ACQUIRE ROLL ANGLE φ1 OF FRONT WHEEL BASED ON BANK ANGLE SENSOR — S11

ACQUIRE ACCELERATION Gz AND ANGULAR VELOCITY ωy BASED ON INERTIAL SENSOR — S12

OBTAIN FRONT WHEEL GROUND LOAD Fzf (FIRST FORCE) — S13

OBTAIN REFERENCE FORCE VECTOR Fz — S14

ACQUIRE ROLL ANGLE φ2 OF REAR WHEEL BASED ON BANK ANGLE SENSOR — S15

ACQUIRE ACCELERATION Gz AND ANGULAR VELOCITY ωy BASED ON INERTIAL SENSOR — S16

ESTIMATE GROUND LOAD Fzr (SECOND FORCE) ON REAR WHEEL — S17

ESTIMATE REAR STROKE SPEED Vpr — S18

CONTROL REAR SUSPENSION MECHANISM — S19

END

F I G.  6A
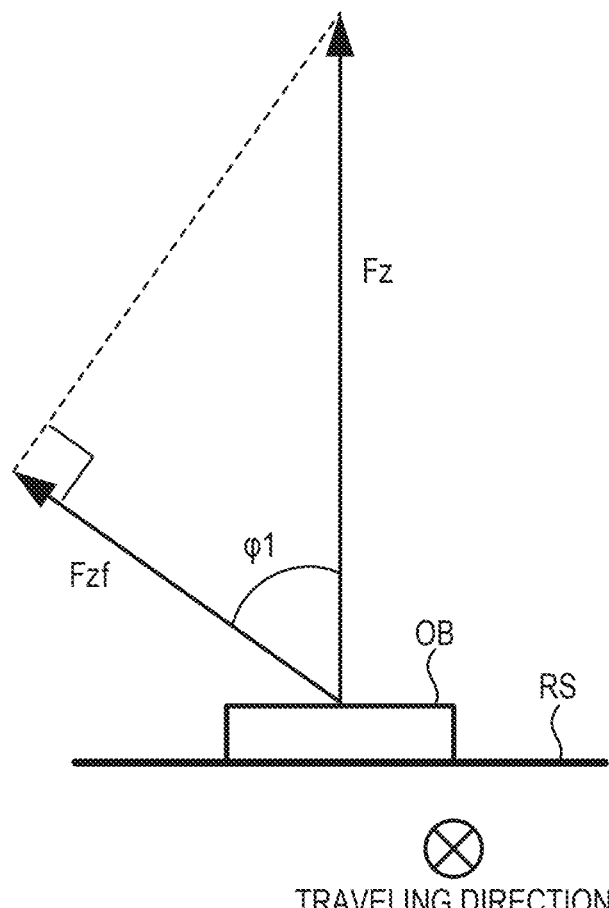
Fz
Fzf
φ1
OB
RS
⊗
TRAVELING DIRECTION
F I G.  6B
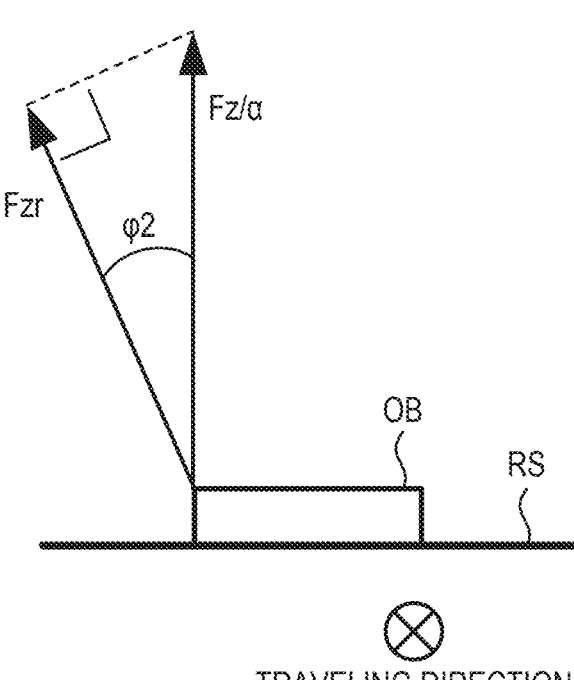
Fz/α
Fzr
φ2
OB
RS
⊗
TRAVELING DIRECTION

CONTROL SYSTEM, STRADDLE TYPE VEHICLE, CONTROL METHOD, AND STORAGE MEDIUM

CROSS-REFERENCE TO RELATED APPLICATION(S)

This application is a continuation of International Patent Application No. PCT/JP2024/008270 filed on Mar. 5, 2024 which claims priority to and the benefit of Japanese Patent Application No. 2023-059053 filed on Mar. 31, 2023, the entire disclosures of which are incorporated herein by reference.

BACKGROUND OF THE INVENTION

Field of the Invention

The present invention relates to a control technique of a vehicle.

Description of the Related Art

Japanese Patent Laid-Open No. 62-103215 discloses a technique of predicting a situation and timing of a change that should occur on the rear wheel side from a stroke displacement generated on the front wheel side, and controlling the damping force of the rear suspension at an appropriate timing corresponding to the situation.

In Japanese Patent Laid-Open No. 62-103215, it is assumed that a load from a road surface is the same between a front wheel and a rear wheel, but in some cases, the load from the road surface is different between the front wheel and the rear wheel depending on a state of a straddle type vehicle such as a bank angle (roll angle) and acceleration. In this case, it is difficult to appropriately control the damping force of a rear suspension, and the steering stability and the riding comfort of the straddle type vehicle may be deteriorated.

SUMMARY OF THE INVENTION

The present invention provides, for example, a technique capable of improving steering stability and riding comfort of a straddle type vehicle.

According to one aspect of the present invention, there is provided a control system of a straddle type vehicle, comprising: at least one processor with a memory comprising instructions, that when executed by the at least one processor, cause the at least one processor to: estimate a second force acting on a rear wheel of the straddle type vehicle from an obstacle, on a basis of a first force acting on a front wheel of the straddle type vehicle from the obstacle; and control a rear suspension mechanism configured to support the rear wheel, on a basis of an estimation result for the second force, when the rear wheel is affected by the obstacle, wherein the at least one processor is configured to estimate, as the second force, a force converted from the first force according to a difference in a state of the straddle type vehicle between when the front wheel is affected by the obstacle and when the rear wheel is affected by the obstacle.

Further features of the present invention will become apparent from the following description of exemplary embodiments with reference to the attached drawings.

BRIEF DESCRIPTION OF THE DRAWINGS

FIG. 2 is a view illustrating a configuration example of a control system according to the first embodiment.

FIG. 5 is a flowchart illustrating a control method of the rear suspension mechanism in the first embodiment.

FIG. 6A is a view for explaining estimation of a ground load (second force) of a rear wheel based on a ground load (first force) of a front wheel in a second embodiment.

FIG. 6B is a view for explaining estimation of a ground load (second force) of a rear wheel based on a ground load (first force) of a front wheel in the second embodiment.

DESCRIPTION OF THE EMBODIMENTS

Figure 1:
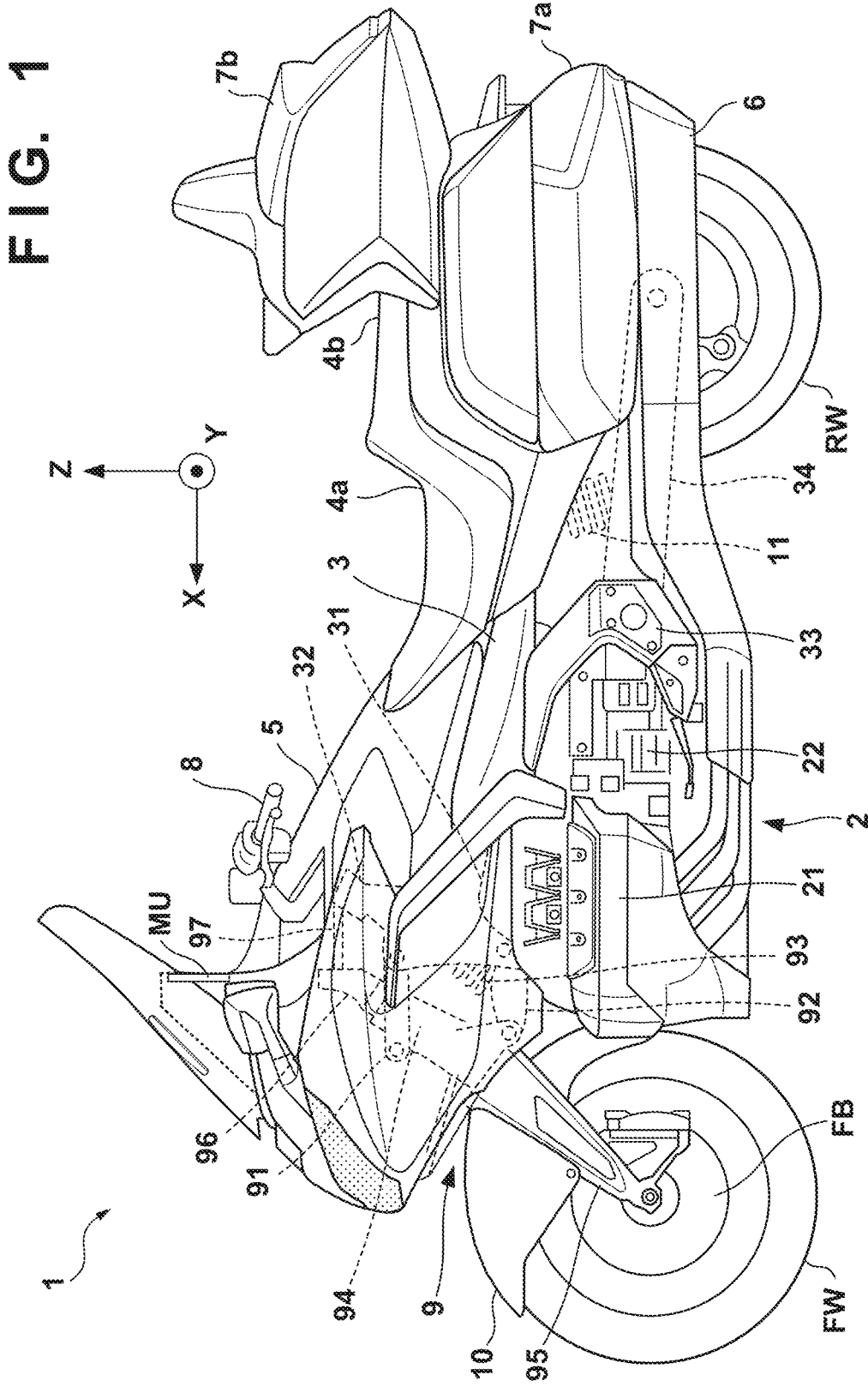
FIG. 1 is a left side view illustrating a straddle type vehicle according to a first embodiment.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment

A first embodiment according to the present invention will be described. FIG. 1 is a left side view illustrating a straddle type vehicle 1 of the present embodiment. In FIG. 1, arrows X, Y, and Z indicate directions orthogonal to one another. The X direction is a front-and-rear direction of the straddle type vehicle 1, the Y direction is a vehicle width direction (left-and-right direction) of the straddle type vehicle 1, and the Z direction is an up-and-down direction of the straddle type vehicle 1. Hereinafter, an example in which the control system according to the present invention is applied to a motorcycle as the straddle type vehicle 1 will be described. However, the control system according to the present invention is also applicable to other types of straddle type vehicles such as a three-wheeled vehicle, and is also applicable to an electric vehicle using a motor as a drive source in addition to a vehicle using an internal combustion engine as a drive source. Hereinafter, the straddle type vehicle 1 may be referred to as a vehicle 1.

The vehicle 1 includes a front wheel FW, a rear wheel RW, and a power unit 2. The power unit 2 includes an engine 21 and a transmission 22. Drive force of the transmission 22 is transmitted to the rear wheel RW via a drive shaft (not illustrated) to rotate the rear wheel RW.

The power unit 2 is supported by a vehicle body frame 3. The vehicle body frame 3 includes a pair of left and right main frames 31 extending in the X direction. A fuel tank 5 and an air cleaner box (not illustrated) are disposed above the main frames 31. A meter unit MU for displaying various types of information to an occupant (rider) is provided on a front side of the fuel tank 5.

A head pipe 32, which rotatably supports a steering axis (not illustrated) rotated by a handlebar 8, is provided at a front end portion of the main frame 31. At a rear end portions of the main frames 31, a pair of left and right pivot plates 33 are provided. Lower end portions of the pivot plates 33 and front end portions of the main frames 31 are connected by a pair of left and right lower arms (not illustrated), and the power unit 2 is supported by the main frames 31 and the lower arms. A pair of left and right seat rails (not illustrated) that extend rearward are also provided at the rear side end portions of the main frames 31, and a seat 4*a* on which a rider is seated, a seat 4*b* on which a passenger is seated, a rear trunk 7*b*, and the like are supported on the seat rails.

A front end portion of a rear swing arm 34 extending in the front-and-rear direction is rotatably attached to the pivot plates 33. The rear wheel RW is rotatably supported by a rear end portion of the rear swing arm 34. The rear swing arm 34 is configured to be swingable in the up-and-down direction by a rear suspension mechanism 11 provided between the rear swing arm 34 and the vehicle body frame 3 (main frame 31). The rear suspension mechanism 11 can be configured as an electronically controlled suspension capable of electronically controlling the damping force. In addition, an exhaust muffler 6 that muffles exhaust of the engine 21 extends in the X direction on the side of the rear wheel RW. In addition, left and right saddle backs 7*a* are provided on the sides of the rear wheel RW.

At the front end portions of the main frames 31, a front suspension mechanism 9, which swingably supports the front wheel FW, is constituted. The front suspension mechanism 9 can be configured as an electronically controlled suspension capable of electronically controlling the damping force. The front suspension mechanism 9 includes an upper link 91, a lower link 92, a fork support body 93, a vibration reduction mechanism 94 (cushion unit), and a pair of left and right front forks 95. In the front suspension mechanism 9, the upper link 91, the lower link 92, the fork support body 93, and the vibration reduction mechanism 94 constitute a support mechanism for supporting the front forks 95 of the vehicle 1.

The upper link 91 and the lower link 92 are vertically disposed at the front end portions of the main frames 31. Rear end portions of the upper link 91 and the lower link 92 are swingably coupled with the front end portions of the main frames 31. The upper link 91 and the lower link 92 are swingably coupled with the fork support body 93.

The fork support body 93 has a tubular shape, and is inclined rearward. A steering shaft 96 is supported by the fork support body 93 to be rotatable about the axis of the steering shaft 96. The steering shaft 96 includes a shaft portion (not illustrated) for inserting into the fork support body 93. A bridge (not illustrated) is provided in a lower end portion of the steering shaft 96, and the pair of left and right front forks 95 are supported by the bridge. The front forks 95 rotatably support the front wheel FW, and also support a front brake FB. An upper end portion of the steering shaft 96 is coupled with a steering axis (not illustrated) rotated by the handlebar 8 via a link 97. An upper portion of the front wheel FW is covered with a fender 10, and the fender 10 is supported by the front forks 95.

Figure 2:
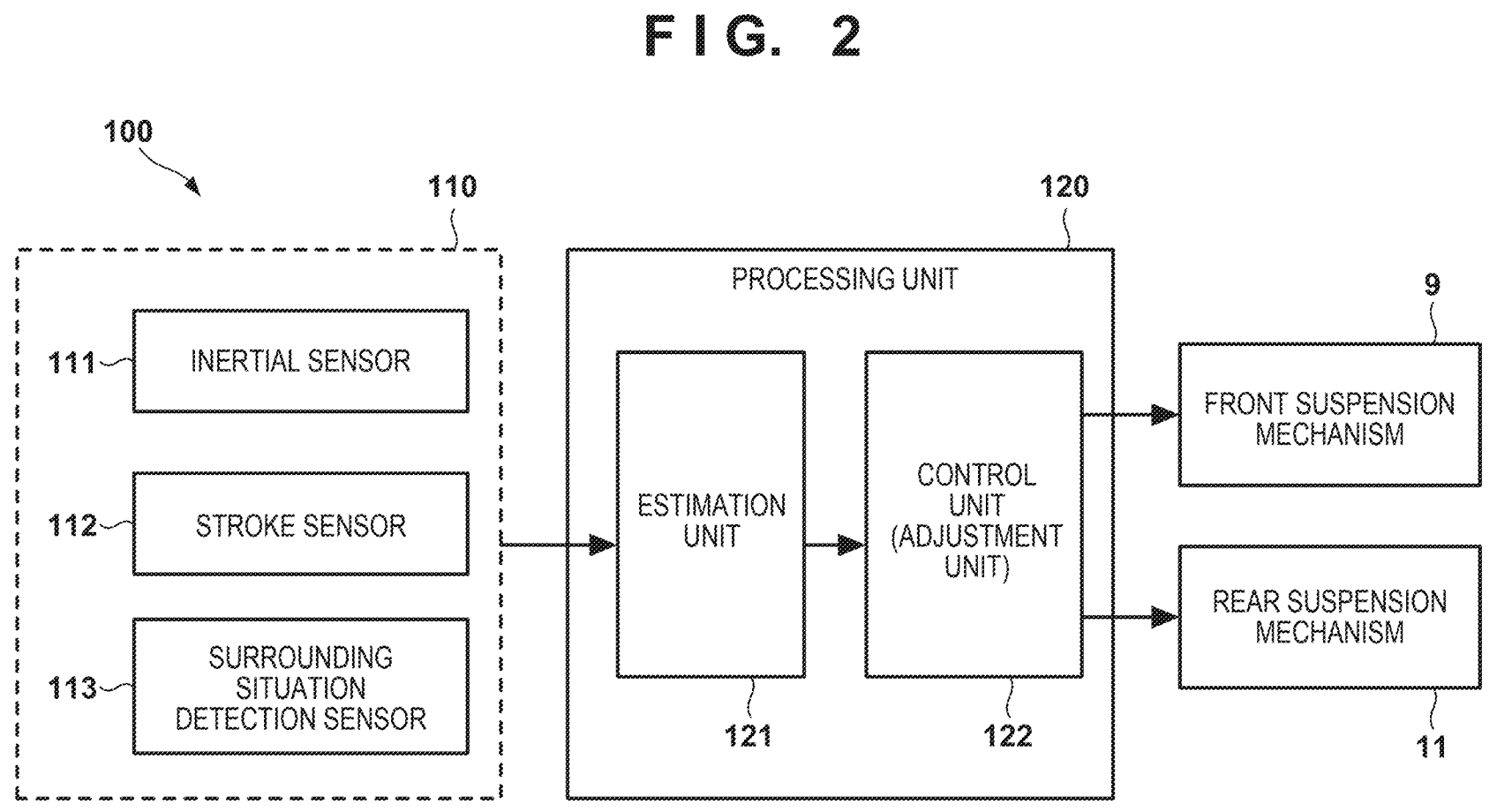

FIG. 2 is a view illustrating a configuration example of a control system 100 (control device) of the present embodiment. The control system 100 is a system that controls a suspension mechanism (the front suspension mechanism 9 and the rear suspension mechanism 11) of the vehicle 1, and may include a sensor group 110 and a processing unit 120. Note that the control system 100 may be configured as a system that controls only the rear suspension mechanism 11.

In this case, the control system 100 may be configured only by the processing unit 120 without including the sensor group 110.

The sensor group 110 may include an inertial sensor 111, a stroke sensor 112, and a surrounding situation detection sensor 113. The inertial sensor 111 may be understood as a detection unit that detects the state of the vehicle 1.

The inertial sensor 111 includes an inertial measurement unit (IMU), which can detect a behavior of the vehicle 1 by detecting acceleration and an angular velocity generated in the vehicle 1 (vehicle body). The inertial sensor 111 (inertial measurement unit) is disposed at any appropriate position of the vehicle 1, for example, in the vicinity of the center of gravity of the vehicle 1. In the case of the present embodiment, the inertial sensor 111 detects translational acceleration in each of the X direction (front-and-rear direction), the Y direction (vehicle width direction), and the Z axis direction (up-and-down direction), and detects angular velocity in each of an $\omega$X direction, an $\omega$Y direction, and an $\omega$Z direction. The $\omega$X direction is a rotation direction around the X axis (a roll direction), the $\omega$Y direction is a rotation direction around the Y axis (a pitch direction), and the $\omega$Z direction is a rotation direction around the Z axis (a yaw direction). In addition, the inertial sensor 111 may be configured to detect the speed of the vehicle 1 and the wheel speed of the vehicle 1.

The stroke sensor 112 detects a stroke speed of the front suspension mechanism 9 (front wheel FW) as a state change of the front suspension mechanism 9. The stroke sensor 112 may be configured to detect a stroke displacement of the front suspension mechanism 9 (front wheel FW). In the vehicle 1 of the present embodiment, the stroke sensor 112 is only provided in the front suspension mechanism 9, and the stroke sensor is not provided in the rear suspension mechanism 11. As a result, the vehicle cost can be reduced. In addition, the surrounding situation detection sensor 113 detects the surrounding situation of the vehicle 1. In the case of the present embodiment, the surrounding situation detection sensor 113 may include a camera and/or a radar (for example, a millimeter wave radar), and may be configured to detect a situation in front of the vehicle 1. Note that the surrounding situation detection sensor 113 can be used in a second embodiment.

The processing unit 120 is, for example, an electronic control unit (ECU), and may include a computer including a processor represented by a CPU, a storage device such as a semiconductor memory, and an interface with external devices. The storage device (memory) of the processing unit 120 stores an application program (hereinafter referred to as a control program in some cases) for controlling the front suspension mechanism 9 and rear suspension mechanism 11 of the vehicle 1, and the processor of the processing unit 120 can read and execute the control program stored in the storage device. Here, the control program includes a program for estimating a force acting on the rear wheel RW of the vehicle 1 and controlling the rear suspension mechanism 11 on the basis of the estimation result. In addition, the control program may be stored in a storage medium such as a CD-ROM, a DVD, or a memory to be installed in the processing unit 120 from the storage medium, or may be downloaded from an external server through a network to be installed in the processing unit 120.

In the case of the present embodiment, the processing unit 120 may include an estimation unit 121 and a control unit (adjustment unit) 122. The estimation unit 121 estimates the second force acting on the rear wheel RW from an obstacle on the basis of the first force acting on the front wheel FW from the obstacle. The estimation of the second force by the estimation unit 121 can be performed on the basis of the detection result in the sensor group 110. The control unit 122 controls the front suspension mechanism 9 and the rear suspension mechanism 11. Specifically, from the viewpoint of improving steering stability and riding comfort of the vehicle 1, the control unit 122 performs so-called skyhook control of controlling (adjusting) the damping force of the front suspension mechanism 9 and the rear suspension mechanism 11 using a skyhook theory assuming a state where the vehicle 1 (vehicle body or the like) is suspended in midair by a virtual line. In the case of the present embodiment, when the rear wheel RW is affected by the obstacle, the control unit 122 controls the rear suspension mechanism 11 on the basis of the estimation result of the estimation unit 121.

Figure 3:
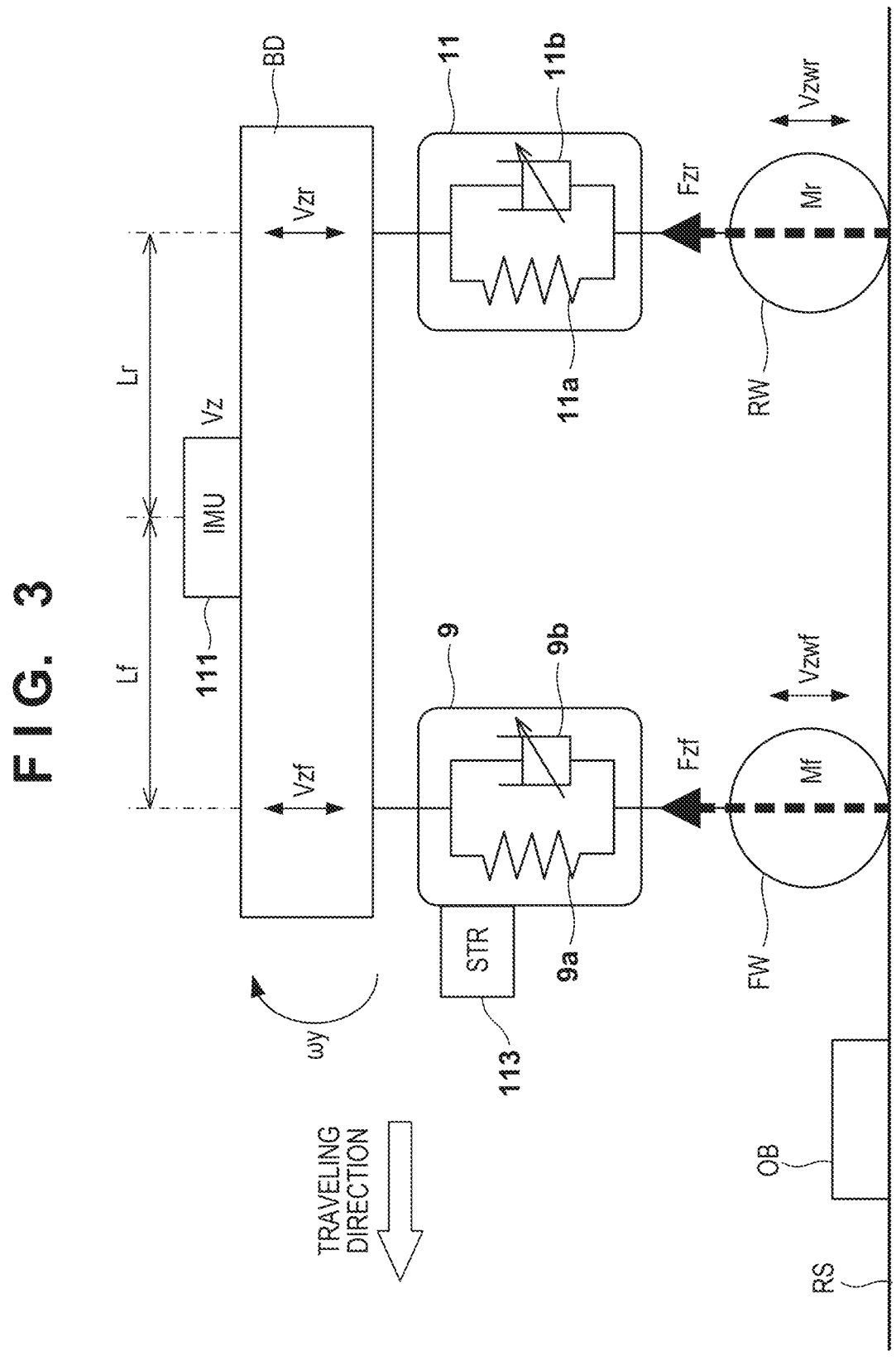
FIG. 3 is a view in which a front suspension mechanism and a rear suspension mechanism in the first embodiment are modeled.

FIG. 3 is a view in which the front suspension mechanism 9 and the rear suspension mechanism 11 in the present embodiment are modeled. The front suspension mechanism 9 and the rear suspension mechanism 11 are mechanisms for reducing vibration transmitted from a road surface RS to a vehicle body BD of the vehicle 1. The front suspension mechanism 9 includes an elastic member 9a and a viscous damping member 9b. Similarly, the rear suspension mechanism 11 includes an elastic member 11a and a viscous damping member 11b.

The elastic members 9a and 11a are members having a spring constant. A spring, rubber, or the like is used as the elastic members 9a and 11a, and a coil spring can be used in the present embodiment. In addition, the viscous damping members 9b and 11b are, although its detailed illustration is omitted, a mono-tube type members and may include a magneto-rheological fluid (MRF) as the hydraulic oil. A piston rod is slidably inserted in an axial direction into a cylinder having a tubular shape filled with the MRF, and the inside of the cylinder is partitioned into an upper oil chamber and a lower oil chamber by a piston attached to a tip end of the piston rod. When an electric current is supplied to a coil located inside a communication passage that communicates the upper oil chamber with the lower oil chamber, a magnetic field is applied to the MRF, which flows in the communication passage, and ferromagnetic particles form clusters. This can change the viscosity of the MRF, which passes through the communication passage, so that the damping force of the viscous damping members 9b and 11b can be changed. That is, the control unit 122 can control (adjust) the damping force of the suspension mechanisms 9 and 11 by supplying an electric current to the coils of the viscous damping members 9b and 11b and changing the viscosity of the magnetic fluid inside the viscous damping members 9b and 11b.

Here, the viscous damping members 9b and 11b are not limited to mechanisms using the magneto-rheological fluid (MRF), and may also be mechanisms that change the amount of oil (hydraulic oil) passing through an orifice by changing the diameter of the orifice with use of a step motor or the like, so as to adjust the damping force. In this case, the control unit 122 can change the amount of oil passing through the orifice by changing the diameters of the orifices of the viscous damping members 9b and 11b, and can control (adjust) the damping force of the suspension mechanisms 9 and 11.

In the control system 100, the stroke sensor 112 is provided in the front suspension mechanism 9, and the front suspension mechanism 9 is controlled by the control unit 122 on the basis of a detection result (that is, the stroke speed detected by the stroke sensor 112) of the stroke sensor 112.

On the other hand, if the stroke sensor is provided for the rear suspension mechanism 11, it may be disadvantageous in terms of vehicle cost. Therefore, the control system 100 estimates the second force acting on the rear wheel RW from an obstacle OB on the basis of the first force (for example, the stroke speed of the front suspension mechanism 9) acting on the front wheel FW from the obstacle OB, and controls the rear suspension mechanism 11 on the basis of the estimation result.

However, in the vehicle 1, depending on the state of the vehicle 1 such as a bank angle (roll angle) and acceleration, in some cases, the load received from the obstacle OB is different between the front wheel FW and the rear wheel RW. In this case, it is difficult to appropriately control (adjust) the damping force of the rear suspension mechanism 11, and the steering stability and the riding comfort of the vehicle 1 may be deteriorated. Therefore, in the control system 100 (estimation unit 121) of the present embodiment, a force converted from the first force according to the difference in the state of the vehicle 1 between when the front wheel FW is affected by the obstacle OB and when the rear wheel RW is affected by the obstacle OB is estimated as the second force acting on the rear wheel RW from the obstacle OB. By obtaining the stroke speed that can be generated in the rear suspension mechanism 11 (rear wheel RW) by the obstacle OB on the basis of the second force estimated in this manner, the damping force of the rear suspension mechanism 11 can be appropriately controlled (adjusted). Hereinafter, a method of calculating the stroke speed of the rear suspension mechanism 11 will be described with reference to FIGS. 3 and 4A to 4B. In the present embodiment, the bank angle (roll angle) of the vehicle 1 will be described as an example of the state of the vehicle 1 different between when the front wheel FW is affected by the obstacle OB and when the rear wheel is affected by the obstacle OB. Note that the obstacle OB may be a protrusion or a recess generated on the road surface RS itself, such as unevenness of the road surface RS, or may be an object disposed or installed on the road surface RS.

[Method for Estimating Rear Stroke Speed]

A stroke speed Vpf (hereinafter, the stroke speed Vpf may be referred to as a front stroke speed Vpf) generated in the front suspension mechanism 9 when the front wheel FW passes through the obstacle OB can be expressed by the following expression (1). "Vzf" in expression (1) represents the speed of the front portion of the vehicle body BD in the up-and-down direction of the vehicle 1, and may be referred to as "front vehicle body speed Vzf" below. When the front suspension mechanism 9 is considered as a spring, the front vehicle body speed Vzf may be understood as the speed of a sprung mass. In addition, "Vzwf" in expression (1) represents the speed of the front wheel FW in the up-and-down direction of the vehicle 1, and hereinafter, may be referred to as "front wheel speed Vzwf". When the front suspension mechanism 9 is considered as a spring, the front wheel speed Vzwf may be understood as the speed of an unsprung mass.

$$Vpf=Vzf-Vzwf \qquad (1)$$

The front vehicle body speed Vzf is expressed by the following expression (2). "Vz" in expression (2) is the speed in the up-and-down direction of the vehicle body BD when the front wheel FW is affected by the obstacle OB, and can be obtained from the detection result of the inertial sensor 111. In the case of the present embodiment, the inertial sensor 111 is configured to detect acceleration Gz in the up-and-down direction. Therefore, a speed Vz can be obtained by integrating the acceleration Gz detected by the inertial sensor 111. "Lf" in expression (2) represents a distance between the front suspension mechanism 9 and the inertial sensor 111 in the front-and-rear direction of the vehicle 1. As the distance Lf, a distance in the horizontal direction between the axle position of the front wheel (front wheel FW) and the representative position (for example, a position or a center of gravity serving as a measurement reference of acceleration or angular velocity) of the inertial sensor 111 can be used. The distance Lf is a known value. "ωy" in expression (2) represents an angular velocity in the pitch direction (ωy direction) detected by the inertial sensor 111 when the rear wheel RW is affected by the obstacle OB.

$$Vzf = Vz - Lf * \omega y \qquad (2)$$

Note that the vehicle 1 may be provided with a vertical speed sensor that detects only a speed in the up-and-down direction of the vehicle body BD instead of the inertial sensor 111. In this case, the speed in the up-and-down direction detected by the vertical speed sensor can be applied to "Vz" in expression (2). In a case where a vertical acceleration sensor that detects only an acceleration in the up-and-down direction of the vehicle body BD is provided instead of the inertial sensor 111, an integral value of the acceleration in the up-and-down direction detected by the vertical acceleration sensor can be applied to "Vz" in expression (2). In addition, the vehicle 1 may be provided with a pitch angular velocity sensor that detects only an angular velocity in the pitch direction instead of the inertial sensor 111. In this case, the angular velocity in the pitch direction detected by the pitch angular velocity sensor can be applied to "ωy" in expression (2).

The front wheel speed Vzwf is expressed by the following expression (3). "Fzf" in expression (3) represents the first force acting on the front wheel FW from the obstacle OB, and may be referred to as a ground load Fzf of the front wheel FW below. In addition, "Mf" in expression (3) represents the front unsprung mass (specifically, mass or weight including a part of the front suspension mechanism 9 in addition to the front wheel FW (front wheel)). The mass Mf of the front wheel FW is a known value. The front wheel speed Vzwf is calculated by integration of values obtained by dividing the ground load Fzf of the front wheel FW by the mass Mf of the front wheel FW.

$$Vzwf = \int Fzf/Mfdt \qquad (3)$$

The following expression (4) can be obtained by substituting expressions (2) to (3) into expression (1). In expression (4), the front stroke speed Vpf is acquired from the detection result of the stroke sensor 112, and the speed Vz and the angular velocity ωy are acquired from the detection result of the inertial sensor 111. The distance Lf and the mass Mf are known values. Therefore, the ground load Fzf of the front wheel FW can be obtained by expression (4).

$$Vpf = (Vz - Lf * \omega y) - \left( \int Fzf/Mfdt \right) \qquad (4)$$

Next, the second force estimated to act on the rear wheel RW from the obstacle OB is obtained on the basis of the

Figure 4A:
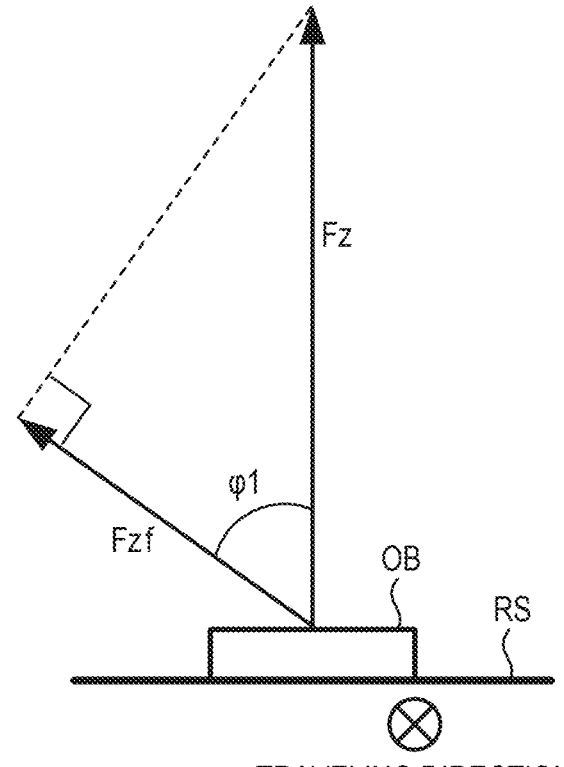
FIG. 4A is a view for explaining estimation of a ground load (second force) of a rear wheel based on a ground load (first force) of a front wheel in the first embodiment.

8 ground load Fzf of the front wheel FW. Hereinafter, the second force may be referred to as the ground load Fzr of the rear wheel RW. Specifically, as illustrated in FIG. 4A, a reference force vector Fz is obtained on the basis of the ground load Fzf of the front wheel FW. The reference force vector Fz represents a force in the reference direction, and can be set as a force in the vertical direction in the present embodiment. The reference force vector Fz can be expressed by expression (5) on the basis of the ground load Fzf of the front wheel FW. "φ1" in expression (5) represents the roll angle of the vehicle 1 when the front wheel FW is affected by the obstacle OB, that is, the roll angle of the front wheel FW, and is acquired by differentiation of a roll angular velocity ox detected by the inertial sensor 111. In the vehicle 1, a bank angle sensor that detects the bank angle of the vehicle 1 may be provided instead of the inertial sensor 111. In this case, the bank angle (roll angle) detected by the bank angle sensor can be applied to "φ1" in expression (5).

$$Fz = Fzf/\cos(\varphi 1) \qquad (5)$$

Figure 4B:
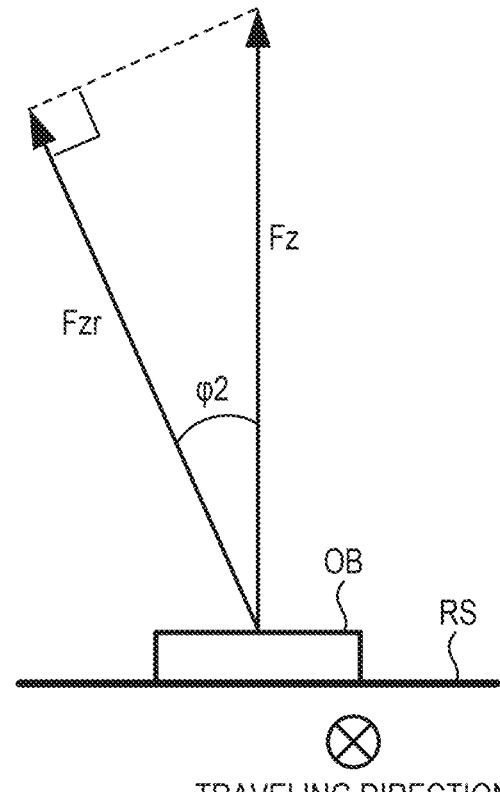
FIG. 4B is a view for explaining estimation of a ground load (second force) of a rear wheel based on a ground load (first force) of a front wheel in the first embodiment.

Meanwhile, the second force (the ground load Fzr of the rear wheel RW) estimated to act on the rear wheel RW from the obstacle OB is estimated (calculated) on the basis of the reference force vector Fz calculated by expression (5) as illustrated in FIG. 4B. That is, the ground load Fzr of the rear wheel RW is estimated (calculated) by expression (6) on the assumption that the reference force vector Fz is the same between when the front wheel FW is affected by the obstacle OB and when the rear wheel RW is affected by the obstacle OB. "φ2" in expression (6) represents the bank angle of the vehicle 1 when the rear wheel RW is affected by the obstacle OB, that is, the roll angle of the rear wheel RW, and is acquired by differentiation of the roll angular velocity ox detected by the inertial sensor 111. In the vehicle 1, a bank angle sensor that detects the bank angle of the vehicle 1 may be provided instead of the inertial sensor 111. In this case, the bank angle (roll angle) detected by the bank angle sensor can be applied to "φ2" in expression (6).

$$Fzr = Fz \times \cos(\varphi 2) \qquad (6)$$

Next, a stroke speed Vpr (hereinafter, the rear stroke speed may be referred to as a rear stroke speed Vpr) estimated to occur in the rear suspension mechanism 11 when the rear wheel RW is affected by the obstacle OB is obtained. The rear stroke speed Vpr can be calculated by the following expression (7). "Vzr" in expression (7) represents the speed of the rear portion of the vehicle body BD in the up-and-down direction of the vehicle 1, and may be referred to as "rear vehicle body speed Vzr" below. In a case where the rear suspension mechanism 11 is considered as a spring, the rear vehicle body speed Vzr may be understood as a speed of the sprung mass. "Vzwr" in expression (7) represents the speed of the rear wheel RW in the up-and-down direction of the vehicle 1, and may be referred to as "rear wheel speed Vzwr" below. In a case where the rear suspension mechanism 11 is considered as a spring, the rear wheel speed Vzwr may be understood as the speed of the unsprung mass.

$$Vpr = Vzr - Vzwr \qquad (7)$$

The rear vehicle body speed Vzr is expressed by the following expression (8). "Vz" in expression (8) is the speed in the up-and-down direction of the vehicle body BD when the rear wheel RW is affected by the obstacle OB, and can be obtained from the detection result of the inertial sensor 111. In the case of the present embodiment, the inertial sensor 111 is configured to detect acceleration Gz in the up-and-down direction. Therefore, a speed Vz can be obtained by integrating the acceleration Gz detected by the inertial sensor 111. "Lr" in expression (8) represents a distance between the rear suspension mechanism 11 and the inertial sensor 111 in the front-and-rear direction of the vehicle 1. As the distance Lr, a distance in the horizontal direction between the axle position of the rear wheel (rear wheel RW) and the representative position (for example, a position or a center of gravity serving as a measurement reference of acceleration or angular velocity) of the inertial sensor 111 can be used. The distance Lr is a known value. In addition, "ωy" in expression (8) represents an angular velocity in the pitch direction (ωy direction) detected by the inertial sensor 111 when the rear wheel RW is affected by the obstacle OB.

$$Vzr = Vz + Lr * \omega y \qquad (8)$$

The rear wheel speed Vzwr is expressed by the following expression (9). "Fzr" in expression (9) represents the second force (ground load of the rear wheel RW) estimated to act on the rear wheel RW from the obstacle OB, and is a value obtained by the above expression (6). In addition, "Mr" in expression (9) represents the rear wheel unsprung mass (specifically, mass or weight including a part of the rear suspension mechanism 11 in addition to the rear wheel RW (rear wheel)). The mass Mr of the rear wheel RW is a known value. The rear wheel speed Vzwr is calculated by integration of values obtained by dividing the ground load Fzr of the rear wheel RW by the mass Mr of the rear wheel RW.

$$Vzwr = \int Fzr/Mr dt \qquad (9)$$

The following expression (10) can be obtained by substituting expressions (8) to (9) into expression (7). In expression (10), the speed Vz and the angular velocity ωy are acquired from the detection result of the inertial sensor 111. In addition, the distance Lr and the mass Mr are known values. The ground load Fzr of the rear wheel RW is estimated (calculated) by the above expression (6). Therefore, the rear stroke speed Vpr can be estimated (calculated) by expression (10). As a result, the control unit 122 can control (adjust) the damping force of the rear suspension mechanism 11 on the basis of the estimated rear stroke speed Vpr.

$$Vpr = (Vz + Lr * \omega y) - \left( \int Fzr/Mr dt \right) \qquad (10)$$

[Control of Rear Suspension Mechanism]

Next, a control method of the rear suspension mechanism 11 in the present embodiment will be described. FIG. 5 is a flowchart illustrating a control method of the rear suspension mechanism 11 in the present embodiment. The flowchart in FIG. 5 can be implemented by the processing unit 120 (estimation unit 121, control unit 122). Note that the flowchart in FIG. 5 can be repeatedly implemented. That is, when step SS19 ends, the processing is started again from step S10.

Steps S10 to S14 are steps of obtaining the reference force vector Fz on the basis of the first force received by the front wheel FW from the obstacle OB.

In step S10, the processing unit 120 acquires the front stroke speed Vpf on the basis of the detection result of the stroke sensor 112. In step S11, the processing unit 120 acquires a roll angle φ1 of the front wheel FW on the basis of the calculation result using the information from the inertial sensor 111. Next, in step S12, the processing unit 120 acquires the acceleration Gz in the up-and-down direction and the angular velocity ωy in the pitch direction of the vehicle body BD on the basis of the detection result of the inertial sensor 111. The acceleration Gz acquired in step S12 is converted into the speed Vz by integration. Here, the processing unit 120 may perform high-pass processing for removing a vibration component (low-frequency component) caused by the movement of the vehicle body BD and the engine 21 with respect to each piece of information acquired in steps S10 to S12.

In step S13, the processing unit 120 obtains the ground load Fzf (first force) acting on the front wheel FW from the obstacle OB by the above expression (4) on the basis of the front stroke speed Vpf acquired in step S10 and the speed Vz and the angular velocity ωy acquired in step S12. Next, in step S14, the processing unit 120 obtains the reference force vector Fz by the above expression (5) on the basis of the roll angle φ1 acquired in step S11 and the ground load Fzf of the front wheel FW obtained in step S13.

Steps S15 to S18 are steps of estimating the second force received by the rear wheel RW from the obstacle OB and estimating the rear stroke speed Vpr on the basis of the estimation result.

In step S15, the processing unit 120 acquires a roll angle φ2 of the rear wheel RW on the basis of the calculation result using the information from the inertial sensor 111. Next, in step S16, the processing unit 120 acquires the acceleration Gz in the up-and-down direction and the angular velocity ωy in the pitch direction of the vehicle body BD on the basis of the detection result of the inertial sensor 111. The acceleration Gz acquired in step S16 is converted into the speed Vz by integration.

In step S17, the processing unit 120 (estimation unit 121) obtains the ground load Fzr (second force) estimated to act on the rear wheel RW from the obstacle OB by the above expression (6) on the basis of the reference force vector Fz obtained in step S14 and the roll angle φ2 of the rear wheel RW obtained in step S15.

In step S18, the processing unit 120 (estimation unit 121) estimates (calculates) the rear stroke speed Vpr by the above expression (10) on the basis of the speed Vz and the angular velocity ωy acquired in step S16 and the ground load Fzr of the rear wheel RW acquired in step S17. Next, in step S19, the processing unit 120 (control unit 122) controls (adjusts) the damping force of the rear suspension mechanism 11 on the basis of the rear stroke speed Vpr estimated in step S18. Here, the processing unit 120 may perform high-pass processing for removing a vibration component (low-frequency component) caused by the movement of the vehicle body BD and the engine 21 with respect to each piece of information acquired in steps S15 to S16. In addition, in step S18, the speed Vz and the angular velocity ωy acquired in step S12 may be used. In this case, step S16 may be omitted.

As described above, the control system 100 of the present embodiment estimates the force converted from the first force (ground load Fzf) according to the difference in the state of the vehicle 1 between when the front wheel FW is affected by the obstacle OB and when the rear wheel is affected by the obstacle OB as the second force (ground load Fzr) acting on the rear wheel RW from the obstacle OB. Then, the rear suspension mechanism 11 is controlled on the basis of the estimated second force. This makes it possible to appropriately control the damping force of the rear suspension mechanism 11 in real time without providing the stroke sensor in the rear suspension mechanism 11. Therefore, it is advantageous in terms of vehicle cost, and steering stability and riding comfort of the straddle type vehicle 1 can be improved.

Second Embodiment

A second embodiment according to the present invention will be described. The present embodiment basically takes over the first embodiment, and can follow the first embodiment except for the matters mentioned below.

In the straddle type vehicle 1, for example, when the vehicle turns a curve, the track on which the front wheel FW travels and the track on which the rear wheel RW travels are shifted (that is, turning radius difference), and the influence of the obstacle OB may be different between the front wheel FW and the rear wheel RW. Therefore, it may be insufficient to accurately control the rear suspension mechanism 11 only by estimating the influence (second force) of the obstacle on the rear wheel RW on the basis of the influence (first force) of the obstacle OB on the front wheel FW without considering the difference in the influence of the obstacle OB between the front wheel FW and the rear wheel RW. Therefore, in the present embodiment, the estimation unit 121 specifies the position and/or shape of the obstacle OB on the basis of the detection result of the surrounding situation detection sensor 113, and calculates the influence degree of the obstacle OB on each of the front wheel FW and the rear wheel RW. Then, the ground load Vpr (second force) acting on the rear wheel RW from the obstacle OB is corrected according to the influence degree calculated for each of the front wheel FW and the rear wheel RW. As a result, the rear suspension mechanism 11 can be accurately controlled.

For example, the influence degree of the obstacle OB is calculated as an index determined according to the location (portion, position) of the obstacle OB through which each of the front wheel FW and the rear wheel RW passes. The estimation unit 121 specifies the position of the obstacle OB and determines (calculates) the track of the front wheel FW and the track of the rear wheel RW on the road surface RS on the basis of the detection result of the surrounding situation detection sensor 113. Then, the estimation unit 121 obtains a first location of the obstacle OB through which the front wheel FW passes and a second location of the obstacle OB through which the rear wheel RW passes. As a result, the influence degree of the obstacle OB on the front wheel FW from the first location and the influence degree of the obstacle OB on the rear wheel RW from the second location can be calculated (estimated).

As an example, it is assumed that the front wheel FW passes through a central portion (first location) of the obstacle OB and the rear wheel FW passes through an end portion (second location) of the obstacle OB. In this case, when the ratio of the influence degree of when the wheel passes through the central portion of the obstacle OB to the influence degree of when the wheel passes through the end portion of the obstacle OB is "1/α" (for example, ½), the ratio is set in advance by experiment, simulation, or the like. The estimation unit 121 multiplies the reference force vector Fz calculated on the basis of the ground load Fzf (first force) of the front wheel FW by 1/α as illustrated in FIG. 6A, and estimates (calculates) the ground load Fzr (second force) of the rear wheel RW on the basis of Fz/a as illustrated in FIG. 6B. In this manner, the ground load Fzr (second force) of the rear wheel RW is corrected according to the influence degree of the obstacle OB on each of the front wheel FW and the rear wheel RW.

Here, the influence degree of the obstacle OB may be calculated as an index determined according to a contact area (ground contact area) between each of the front wheel FW and the rear wheel RW and the obstacle OB. In this case, the coefficient "1/α" can be set (determined) as a ratio of the contact area between the rear wheel RW and the obstacle OB to the contact area between the front wheel FW and the obstacle OB. In addition, the influence degree of the obstacle OB may be calculated as an index determined according to the height of the location of the obstacle OB through which each of the front wheel FW and the rear wheel RW passes. In this case, the coefficient "1/α" can be set (determined) as a ratio of the height of the location of the obstacle OB through which the rear wheel RW passes to the height of the location of the obstacle OB through which the front wheel FW passes.

Third Embodiment

A third embodiment according to the present invention will be described. The present embodiment basically takes over the first embodiment, and can follow the first embodiment except for the matters mentioned below. In addition, in the present embodiment, the second embodiment may be applied.

In a case where a height h of the obstacle OB can be acquired on the basis of the detection result of the surrounding situation detection sensor 113, the estimation unit 121 can calculate the ground load Fzf of the front wheel FW and the ground load Fzr of the rear wheel RW by the following expression (11). In expression (11), the ground load Fzf can be calculated by the two times differentiation of "h/cos φ1", and the ground load Fzr can be calculated by the two times differentiation of "h/cos φ2".

$$Fzf = Mf * d^2(h/\cos\varphi 1)/dt^2 \tag{11}$$

$$Fzr = Mr * d^2(h/\cos\varphi 2)/dt^2$$

SUMMARY OF EMBODIMENTS

1. A control system of the above-described embodiments is a control system (e.g. 100) of a straddle type vehicle (e.g. 1), characterized by comprising:

estimation means (e.g. 121) for estimating a second force (e.g. Fzr) acting on a rear wheel (e.g. RW) of the straddle type vehicle from an obstacle (e.g. OB), on a basis of a first force (e.g. Fzf) acting on a front wheel (e.g. FW) of the straddle type vehicle from the obstacle; and control means (e.g. 122) for controlling a rear suspension mechanism (e.g. 11) configured to support the rear wheel, on a basis of an estimation result of the estimation means, when the rear wheel is affected by the obstacle, wherein the estimation means estimates, as the second force, a force converted from the first force according to a difference in a state of the straddle type vehicle between when the front wheel is affected by the obstacle and when the rear wheel is affected by the obstacle.

According to this embodiment, it is possible to appropriately control the rear suspension mechanism in real time without installation of the stroke sensor in the rear suspension mechanism. Therefore, it is advantageous in terms of vehicle cost, and steering stability and riding comfort of the straddle type vehicle can be improved.

2. In the above-described embodiments, the state of the straddle type vehicle includes a roll angle of the straddle type vehicle.

According to this embodiment, the rear suspension mechanism can be appropriately controlled according to the difference in the roll angle of the straddle type vehicle between when the front wheel is affected by the obstacle and when the rear wheel is affected by the obstacle.

3. In the above-described embodiments, the estimation means estimates the second force on a basis of the first force, a roll angle (e.g. $\varphi1$) of the straddle type vehicle when the front wheel is affected by the obstacle, and a roll angle (e.g. $\varphi2$) of the straddle type vehicle when the rear wheel is affected by the obstacle.

According to this embodiment, the second force received by the rear wheel from the obstacle can be accurately estimated from the first force received by the front wheel from the obstacle according to the difference in the roll angle of the straddle type vehicle between when the front wheel is affected by the obstacle and when the rear wheel is affected by the obstacle.

4. In the above-described embodiments, the control system further comprises first detection means (e.g. 113) for detecting surrounding situation of the straddle type vehicle, and the estimation means:

specifies a position and/or a shape of the obstacle on a basis of a detection result of the first detection means, and calculates influence degree of the obstacle on each of the front wheel and the rear wheel; and corrects the second force according to the influence degree calculated for each of the front wheel and the rear wheel.

According to this embodiment, the second force acting on the rear wheel from the obstacle can be appropriately corrected according to the influence degree of the obstacle on each of the front wheel and the rear wheel, so that the rear suspension mechanism can be controlled more accurately.

5. In the above-described embodiments, the influence degree is an index determined according to a location of the obstacle through which each of the front wheel and the rear wheel passes.

According to this embodiment, the second force acting on the rear wheel from the obstacle can be appropriately corrected according to the influence degree of the obstacle on each of the front wheel and the rear wheel, so that the rear suspension mechanism can be controlled more accurately.

6. In the above-described embodiments, the influence degree is an index determined according to a contact area between each of the front wheel and the rear wheel and the obstacle.

According to this embodiment, the second force acting on the rear wheel from the obstacle can be appropriately corrected according to the influence degree of the obstacle on each of the front wheel and the rear wheel, so that the rear suspension mechanism can be controlled more accurately.

7. In the above-described embodiments, the influence degree is an index determined according to a height of a location of the obstacle through which each of the front wheel and the rear wheel passes.

According to this embodiment, the second force acting on the rear wheel from the obstacle can be appropriately corrected according to the influence degree of the obstacle on each of the front wheel and the rear wheel, so that the rear suspension mechanism can be controlled more accurately.

8. In the above-described embodiments, the control system further comprises a second detection means (e.g. 112) for detecting a state change of a front suspension mechanism (e.g. 9) configured to support the front wheel, and the estimation means determines the first force on a basis of a detection result of the second detection means.

According to this embodiment, the first force acting on the front wheel from the obstacle can be appropriately obtained.

9. In the above-described embodiments, the control system further comprises a third detection means (e.g. 111) for detecting a state of the straddle type vehicle, and the estimation means estimates the second force on a basis of a detection result of the third detection means.

According to this embodiment, the second force acting on the front wheel from the obstacle can be accurately estimated.

The invention is not limited to the foregoing embodiments, and various variations/changes are possible within the spirit of the invention.

What is claimed is:

1. A control system of a straddle type vehicle, comprising:
at least one processor with a memory comprising instructions, that when executed by the at least one processor, cause the at least one processor to:
estimate a second force acting on a rear wheel of the straddle type vehicle from an obstacle, on a basis of a first force acting on a front wheel of the straddle type vehicle from the obstacle; and
control a rear suspension mechanism configured to support the rear wheel, on a basis of an estimation result for the second force, when the rear wheel is affected by the obstacle,
wherein the at least one processor is configured to estimate, as the second force, a force converted from the first force according to a difference in a state of the straddle type vehicle between when the front wheel is affected by the obstacle and when the rear wheel is affected by the obstacle.

2. The control system according to claim 1, wherein the state of the straddle type vehicle includes a roll angle of the straddle type vehicle.

3. The control system according to claim 2, wherein the at least one processor is configured to estimate the second force on a basis of the first force, a roll angle of the straddle type vehicle when the front wheel is affected by the obstacle, and a roll angle of the straddle type vehicle when the rear wheel is affected by the obstacle.

4. The control system according to claim 3, wherein the at least one processor is configured to estimate the second force by correcting a force received by the front wheel in a vertical direction from the obstacle according to a roll angle of the rear wheel, on a basis of a ground load of the front wheel.

5. The control system according to claim 4, wherein the force received by the front wheel in the vertical direction is calculated on a basis of the first force and a roll angle of the front wheel when the front wheel is affected by the obstacle.

6. The control system according to claim 1, further comprising a first detector configured to detect surrounding situation of the straddle type vehicle, wherein the at least one processor is configured to:

specify a position and/or a shape of the obstacle on a basis of a detection result of the first detector, and calculates influence degree of the obstacle on each of the front wheel and the rear wheel; and correct the second force according to the influence degree calculated for each of the front wheel and the rear wheel.

7. The control system according to claim 6, wherein the influence degree is an index determined according to a location of the obstacle through which each of the front wheel and the rear wheel passes.

8. The control system according to claim 6, wherein the influence degree is an index determined according to a contact area between each of the front wheel and the rear wheel and the obstacle.

9. The control system according to claim 6, wherein the influence degree is an index determined according to a height of a location of the obstacle through which each of the front wheel and the rear wheel passes.

10. The control system according to claim 1, further comprising a second detector configured to detect a state change of a front suspension mechanism configured to support the front wheel, wherein the at least one processor is configured to determine the first force on a basis of a detection result of the second detector.

11. The control system according to claim 1, further comprising a third detector configured to detect a state of the straddle type vehicle, wherein the at least one processor is configured to estimate the second force on a basis of a detection result of the third detector.

12. A straddle type vehicle comprising the control system according to claim 1.

13. A control method of a straddle type vehicle, comprising:

estimating a second force acting on a rear wheel of the straddle type vehicle from an obstacle, on a basis of a first force acting on a front wheel of the straddle type vehicle from the obstacle; and controlling a rear suspension mechanism configured to support the rear wheel, on a basis of an estimation result in the estimation step, when the rear wheel is affected by the obstacle, wherein a force converted from the first force according to a difference in a state of the straddle type vehicle between when the front wheel is affected by the obstacle and when the rear wheel is affected by the obstacle is estimated as the second force.

14. A non-transitory computer-readable storage medium storing a program for causing a computer to execute the control method according to claim 13.

\* \* \* \* \*